United States Patent
Aguera y Arcas

(10) Patent No.: US 7,546,419 B2
(45) Date of Patent: Jun. 9, 2009

(54) EFFICIENT DATA CACHE

(76) Inventor: Blaise Aguera y Arcas, 620 24th Ave. E., Seattle, WA (US) 98112-4716

( * ) Notice: Subject to any disclaimer, the term of this patent is extended or adjusted under 35 U.S.C. 154(b) by 286 days.

(21) Appl. No.: 11/141,958

(22) Filed: Jun. 1, 2005

(65) Prior Publication Data

US 2005/0268044 A1    Dec. 1, 2005

Related U.S. Application Data

(60) Provisional application No. 60/575,987, filed on Jun. 1, 2004.

(51) Int. Cl.
G06F 12/00 (2006.01)
G06F 13/00 (2006.01)
G06F 13/28 (2006.01)

(52) U.S. Cl. ........ 711/133; 711/118; 711/134; 711/136

(58) Field of Classification Search .......... 711/133
See application file for complete search history.

(56) References Cited

U.S. PATENT DOCUMENTS

| | | |
|---|---|---|
| 4,532,605 A | 7/1985 | Waller |
| 4,549,275 A | 10/1985 | Sukonick |
| 4,847,788 A | 7/1989 | Shimada |
| 5,222,205 A | 6/1993 | Larson |
| 5,237,647 A | 8/1993 | Roberts et al. |
| 5,367,615 A | 11/1994 | Economy et al. |
| 5,471,572 A | 11/1995 | Buchner |
| 5,590,250 A | 12/1996 | Lamping |
| 5,666,475 A | 9/1997 | Salesin |
| 5,699,497 A | 12/1997 | Erdahl |
| 5,760,783 A | 6/1998 | Migdal et al. |
| 5,999,187 A | 12/1999 | Dehmlow |
| 6,002,406 A | 12/1999 | Zhao |
| 6,034,661 A | 3/2000 | Servan-Scheiber |
| 6,154,213 A | 11/2000 | Rennison |
| 6,184,894 B1 | 2/2001 | Rosman |
| 6,191,793 B1 | 2/2001 | Piazza et al. |
| 6,204,850 B1 | 3/2001 | Green |
| 6,204,857 B1 | 3/2001 | Piazza |
| 6,259,458 B1 | 7/2001 | Theisen et al. |
| 6,313,837 B1 | 11/2001 | Assa et al. |
| 6,324,621 B2 * | 11/2001 | Singh et al. ......... 711/129 |
| 6,348,921 B1 | 2/2002 | Zhao |

(Continued)

OTHER PUBLICATIONS

Bill Overall, Foveated Image: Applications to Image and Video Compress, Mar. 12, 1999, http://scien.standord, edu/class/psych221/projects/99/wro.

(Continued)

*Primary Examiner*—Kevin L Ellis
*Assistant Examiner*—Ryan Bertram
(74) *Attorney, Agent, or Firm*—Shook, Hardy & Bacon L.L.P.

(57) ABSTRACT

A method is disclosed which may include providing a cache in a computing system having an initial group of cache objects, the cache object having an initial compression ratio and including stored data; decreasing an amount of data storage space in the cache occupied by at least one of the cache objects other than a given one of the cache objects; and increasing an amount of data storage space in the cache occupied by the given cache object.

32 Claims, 4 Drawing Sheets

U.S. PATENT DOCUMENTS

| | | |
|---|---|---|
| 6,356,659 B1 | 3/2002 | Wiskott |
| 6,360,029 B1 | 3/2002 | Moller |
| 6,373,495 B1 | 4/2002 | Lin |
| 6,392,661 B1 | 5/2002 | Tankersley |
| 6,400,372 B1 | 6/2002 | Gossweiler, III |
| 6,453,330 B1 | 9/2002 | Battle |
| 6,476,829 B1 | 11/2002 | Smith |
| 6,493,858 B2 | 12/2002 | Solomon |
| 6,501,482 B1 | 12/2002 | Rosman |
| 6,505,205 B1 | 1/2003 | Kothuri et al. |
| 6,509,892 B1 | 1/2003 | Cooper et al. |
| 6,563,517 B1 | 5/2003 | Bhagwat et al. |
| 6,639,598 B2 | 10/2003 | Piazza |
| 6,650,326 B1 | 11/2003 | Huber |
| 6,681,056 B1 | 1/2004 | Tseng et al. |
| 6,747,649 B1 | 6/2004 | Sanz-Pastor |
| 6,763,137 B1 | 7/2004 | Krtolica |
| 6,763,139 B1 | 7/2004 | Andrew |
| 6,885,939 B2 | 4/2005 | Schmidt et al. |
| 6,904,423 B1 | 6/2005 | Nicolaou et al. |
| 6,907,345 B2 | 6/2005 | Shipley |
| 6,909,965 B1 | 6/2005 | Beesley |
| 6,912,462 B2 | 6/2005 | Ogaki |
| 6,927,782 B2 | 8/2005 | Coldefy |
| 6,943,811 B2 | 9/2005 | Matthews |
| 6,981,119 B1 * | 12/2005 | Lepak et al. ............. 711/170 |
| 6,982,726 B1 | 1/2006 | Berestov |
| 7,072,764 B2 | 7/2006 | Donath |
| 7,088,866 B2 | 8/2006 | Andrew |
| 7,181,457 B2 * | 2/2007 | Reinauer et al. ............. 707/10 |
| 7,248,262 B2 | 7/2007 | Cao |
| 7,283,135 B1 | 10/2007 | Cote et al. |
| 7,346,856 B2 | 3/2008 | Nguyen et al. |
| 2001/0030647 A1 | 10/2001 | Sowizral |
| 2002/0075311 A1 | 6/2002 | Orbanes et al. |
| 2002/0116586 A1 * | 8/2002 | Tremblay et al. ........... 711/143 |
| 2003/0026268 A1 | 2/2003 | Navas |
| 2003/0135649 A1 | 7/2003 | Buckley et al. |
| 2004/0095400 A1 | 5/2004 | Anderson et al. |
| 2004/0128070 A1 | 7/2004 | Schmidt |
| 2004/0130579 A1 | 7/2004 | Ishii et al. |
| 2004/0170332 A1 | 9/2004 | Andrew |
| 2004/0187124 A1 | 9/2004 | Labelle |
| 2005/0041858 A1 | 2/2005 | Celi et al. |

OTHER PUBLICATIONS

Foley et al., Computer Graphics: Principles and Practice, Addison-Wesley Publishing Company Inc., 1997, p. 166-170.

Hierarchical Data Structures, CS488/688: Introduction to Interactive Computer Graphics, University of Waterloo, Feb. 18, 2001, http://web.archive.org/web/20010280051725/http:/medialab.di.unipi.it/web/IUM/Waterloo/node73.html.

How to Read a United States National Grid (USNG) Spatial Address, 2000, http:/www.xyproject.org/How%20Read%20USNG/How%20to%20read%20USNG.htm.

Mix-in class for Patent Figures, May 10, 2000. http://web.archive.org/web/20030510164335/http://openhealth.com/bw/doc/auto/Parent.html.

Reading Topographic Maps, Feb. 14, 2003, http://web.archive.org/web/20030214004603/http://www.map-reading.com/ch4-3,php.

Space Variant Imaging, Nov. 25, 2002, http://web.archive/org/web/20021125075827/http://www.svi.cps.utexas.edu/index.htm.

TDB-ACC-NO: NN 961137—Disclosure Title: Multidimensional Index Structure With Multi-Level Entry and Skip-Level Search for Partially-Specified Queries.—Publication-Data: IBM Technical Disclosure Bulletin, Nov. 1996, US.

The Annotated VRML 97 Reference, 1999, http://accad.osu.edu/~pgerstma/class/vnv/resources/info/AnnotatedVrmlRef/ch1.htm.

International Search Report and Written Opinion in PCT/US/2006/011405.

Chi, Chi-Hung, et al. "Pervasive Web Content Delivery with Efficient Data Reuse" Jul. 26, 2004, [online] [retrieved on Jun. 15, 2007] Retrieved from the Internet <URL:http://web.archive.org/web/20040726072942/http://2002.iwcw.org/papers/18500120.pdf> entire document (especially p. 8, col. 1, p. 9, col. 2, p. 11, col. 1, p. 13).

* cited by examiner

300 | CO 1 (302) | CO 2 (304) | CO 4 (308) | CO 5 (310) | FREE (402) |

EFFICIENT DATA CACHE

CROSS-REFERENCE TO RELATED APPLICATIONS

This application claims the benefit of U.S. Provisional Patent Application Ser. No. 60/575,987, filed Jun. 1, 2004, entitled "The Zeno cache: a system for increasing the effectiveness of most-recently-used (MRU) caching for variably compressable data objects," the entirety of the disclosure of which application is hereby incorporated herein by reference.

BACKGROUND OF THE INVENTION

"MRU caching," where MRU stands for "most recently used," is a known concept for implementing a client-side memory in a client-server system. It is assumed that the server has access to and can serve to a client a large number of data objects, which in the aggregate may occupy a large amount of memory. The available bandwidth between client and server is limited, however, so client requests for data objects to be sent from the server take time. If access to data objects is reasonably "coherent," meaning that objects which the client needed recently are likely to be needed again in the near future, then MRU caching may increase the efficiency of the client-server system. Employing this approach, the client generally sets aside some limited amount of memory (generally much less than would be needed to store all of the objects on the server), and stores in this memory (a cache) as many of the most recently requested objects as will fit. When a new object is sent from the server to the client and the client's cache space has run out, the least recently used (LRU) object is erased from the cache to create data storage space in which the new object may be stored.

Generally, when the client needs a data object, the cache is first examined to see if the object is cached. If it is cached, then the cached representation is used, obviating the need for a slow or computationally expensive server request. Usually, making use of a cached representation also "promotes" that object to the MRU end of the cache. This approach generally provides substantial performance advantages over having to request data from the server for every data object accessed.

The erasure of the least recently used object from a cache when a new object is accessed by a computing system and stored in the cache may cause inefficiency in cache usage. Even the erased, least-recently-used object in the cache may be again requested by the server. When this happens, the server may undertake the relatively slow or computationally expensive task of retrieving this object from a more remote source of data storage, such as a main memory or mass storage device. Given the finite size of cache memories, object erasure may occur with some frequency, thereby causing a server or other computing system to expend significant resources accessing more remote memories to get data that was once conveniently stored in a cache memory. Accordingly, there is a need in the art for a more efficient and flexible approach to cache memory management.

SUMMARY OF THE INVENTION

According to one aspect, the invention may provide a method, comprising providing a cache in a computing system having an initial group of cache objects, each cache object having an initial compression ratio and including stored data; decreasing an amount of data storage space occupied by at least one of the cache objects other than a given one of the cache objects; and increasing an amount of data storage space occupied by the given cache object. Preferably, the decreasing comprises decreasing the amount of data storage space by a given amount. Preferably, the increasing comprises increasing the amount of data storage space occupied by the given cache object by the given amount. Preferably, the decreasing comprises increasing the initial compression ratio of the at least one cache object. Preferably, the increasing comprises decreasing the initial compression ratio of the given cache object. Preferably, the given cache object is a most recently used cache object of the cache objects. Preferably, the at least one cache object undergoing the decreasing step comprises a least recently used cache object of the cache objects.

Preferably, the decreasing comprises removing a portion of the stored data for the at least one cache object. Preferably, the increasing comprises supplementing the stored data for the given cache object. Preferably, an amount of data storage space available for each of the cache objects may equal one of a finite number of discrete values. Preferably, the decreasing comprises reducing the amount of data storage space for at least one randomly selected cache object of the cache objects, other than the given cache object. Preferably, the reducing comprises reducing the amount of data storage space for the at least one randomly selected cache object to a randomly determined extent. Preferably, the randomly selected cache object is selected using one of a random method and pseudo-random method. Preferably, the selection of the randomly selected cache object is guided by a heuristic.

Preferably, the method further comprises storing the given cache object in a losslessly compressed form after the increasing. Preferably, the method further comprises storing the given cache object in uncompressed form after the increasing. Preferably, the decreasing comprises removing at least one of the cache objects other than the given cache object.

According to another aspect, the invention may provide an apparatus, comprising a computing system having at least one processor capable of operative communication with a main memory; and a cache in the computing system having an initial group of cache objects, each cache object having an initial compression ratio and including stored data; wherein the computing system is operable to decrease an amount of data storage space occupied by at least one of the cache objects other than a given one of the cache objects; and increase an amount of data storage space occupied by the given cache object. Preferably, the decreasing comprises decreasing the amount of data storage space by a given amount. Preferably, the increasing comprises increasing the amount of data storage space occupied by the given cache object by the given amount. Preferably, the decreasing comprises increasing the initial compression ratio of the at least one cache object. Preferably, the increasing comprises decreasing the initial compression ratio of the given cache object.

Preferably, the given cache object is a most recently used cache object of the cache objects. Preferably, the decreasing comprises removing a portion of the stored data for the at least one cache object. Preferably, the increasing comprises supplementing the stored data for the given cache object. Preferably, an amount of data storage space available for each of the cache objects may equal one of a finite number of discrete values. Preferably, the decreasing comprises reducing the amount of data storage space for at least one randomly selected cache object of the cache objects, other than the given cache object. Preferably, the reducing comprises reducing the amount of data storage space for the at least one randomly selected cache object to a randomly determined extent.

According to another aspect, the invention provides method, comprising: providing a cache in a computing system, the cache having an initial condition; if insufficient data storage space is present in the cache under the initial condition to store at least one new object in the cache, compressing at least one object in the cache to clear data storage space for the at least one new object; and storing the at least one new object in the cache. Preferably, the initial condition corresponds to the cache being empty. Preferably, the method further comprises continuing to store new objects in the cache without compressing the objects stored in the cache until insufficient data storage space remains in the cache to store any additional new object. Preferably, the method further comprises storing the at least one new object in the cache without the compressing, if sufficient space for storing the at least one new object is present in the cache under the initial condition.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

FIG. 3 is a block diagram of a data cache including a plurality of cache objects in accordance with one or more embodiments of the present invention;

FIG. 4 is a block diagram of the data cache of FIG. 3 in which cache objects have been resized in accordance with one or more embodiments of the present invention;

FIG. 5 is a block diagram of the data cache of FIG. 4 in which an accessed cache object has been resized and restored to the cache in accordance with one or more embodiments of the present invention;

Figure 1:
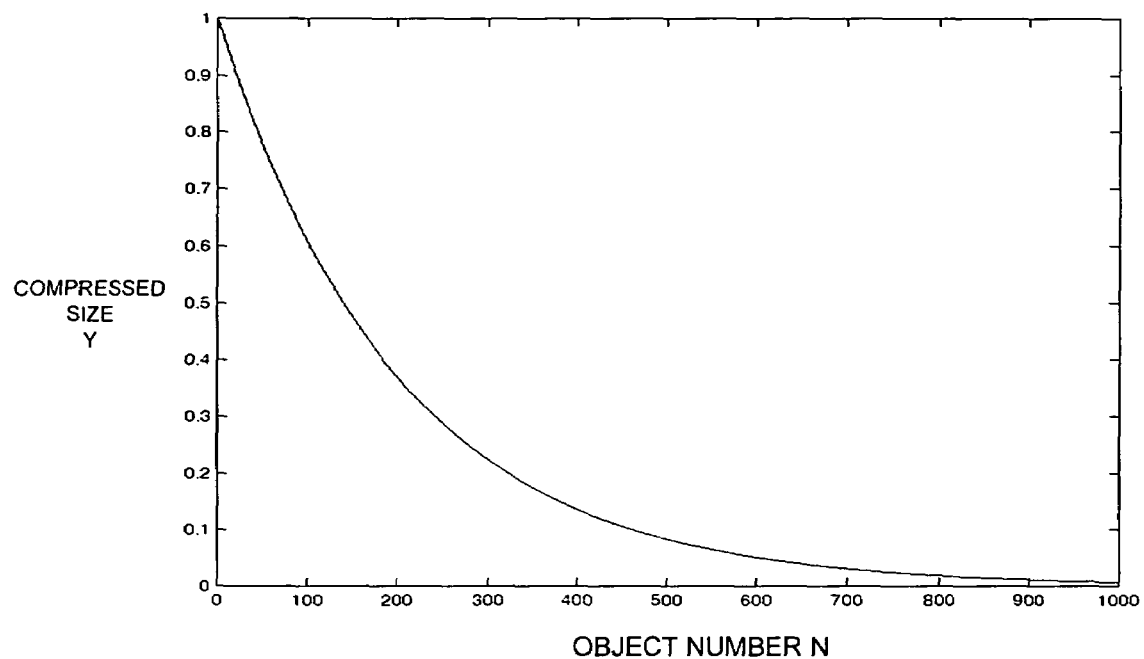
FIG. 1 is a graph of the data storage sizes of individual cache objects in a cache as a function of the cache objects' recency of use within the cache, in accordance with one or more embodiments of the present invention.

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

This disclosure makes reference to the LRU and MRU ends of the cache. Objects are generally added at the MRU end, and are generally erased from the LRU end. However, the present invention is not limited to such a scheme. It is noted that the physical layout of cache objects in a cache need not correspond to the LRU-MRU layout. The layout of a cache merely preferably enables a computing system to find, insert, and/or erase objects in the manner described herein. The linear LRU-MRU arrangement is a convenient mechanism for describing the operation of a cache, but represents only one of many possible implementations of a cache memory. Herein, the terms "cache" and "cache memory" are used interchangeably.

It is noted that, although MRU caching and its extensions disclosed herein are discussed in the context of a client/server architecture, similar principles apply to many other scenarios, such as efficient hard disk access on a single computer (where access to the hard disk is slower than access to RAM, and RAM is thus used to cache the most recently used content on the hard disk). In one or more other embodiments, data are gathered from the environment or generated computationally rather than being loaded from a disk or sent across a network. In each case, the client has access to a small but fast temporary cache memory, and a larger but slower data source from which information is requested repeatedly. This slower data source is generally referred to herein as the "server."

The following discussion of convergent series is provided as an introduction to the cache memory apparatus and method disclosed herein.

The infinite sum of the series $y(n)=n^{-p}$, with n going from 1 to infinity, and with $p>1$, is finite. Similarly, the sum of $y=1/b^n$ is finite for $b>1$. For example, in the latter case, if $b=2$, the sum is exactly 2. The principles underlying such convergent series may be used to implement one or more embodiments of efficient data caching methods and apparatus as described herein.

One or more embodiments of the methods and apparatus described herein may employ concepts related to the "Zeno paradox," which is described below. While this discussion provides a conceptual underpinning applicable to one or more embodiments described herein, the present invention is not limited by the conceptual aspects discussed below.

Zeno Caching Concept.

Zeno is a runner who is so quick that in one step (which, for the sake of discussion, it is assumed he makes every second) he covers half the distance from his current position to the end of any racetrack. The paradox is that he never finishes the course, even though he moves forward with every step. This paradox is easily related to the $1/b^n$ series above with $b=2$, and summing from $n=2$ to infinity. This concept may be extended to the storage of cache objects (with the cache itself being analogized to the "racetrack") by enabling the cache objects to be compressed to a progressively greater extent with decreasing recency of use or access. Thus, in proceeding from the MRU end of a cache to the LRU end thereof, a theoretically infinite number of additional cache objects of ever decreasing size could be put in place, without ever running out of space. This principle is referred to herein as the Zeno cache concept.

Preferably, the cache objects concerned herein are compressible, which in this disclosure, corresponds to being amenable to lossy data compression techniques. Lossy data compression may be characterized by the ability to represent a data object with fewer bytes than the full representation of the data object. Higher compression ratios generally incur higher distortion of the data object and lower quality of an image rendered using the compressed data (where the object includes one or more image files). Without limitation, lossy compression techniques may also be applicable to sound, video, and many other data types.

In one or more embodiments, compressed versions of the data may be suitable as substitutes for the uncompressed data. Below a given level of distortion, the compressed representations of the data may be fully adequate, and above the given level of distortion, the compressed representations may be adequate as a temporary measure while the client waits for a higher quality version of the data. The higher quality version may merely be less compressed than the temporarily used version, or may be losslessly compressed or uncompressed.

In one or more embodiments, lower quality representations may be subsets of higher quality representations, meaning that improving the representation quality at the client side may involve merely sending data to supplement lower quality representations, thereby providing the higher quality representation. Preferably, with this approach, there is no need to incur the burden of sending an entirely new set of data associated with the high quality representation. This approach preferably avoids redundancy and hence preferably substantially increases efficiency.

Consistent with the approach discussed above, the reverse process of lowering the representation quality of an object may involve merely removing a portion of the data employed for a high quality representation of an image, rather than requiring compression, or re-compression, of the data used for the high quality representation. This property preferably also enhances the efficiency of the caching apparatus and method disclosed herein.

In one or more embodiments, the compression technique may provide objects with compression levels that scale from lossy to lossless. This feature may allow a lossless representation of a data object to be built up in steps, from highly lossy to lossless, at little or no extra total cost relative to sending across a lossless version initially. An example of a data type and compression technology enabling the above features is the wavelet compression of images, as exemplified by the JPEG2000 standard. However, the present invention is not limited the use of the JPEG2000 standard.

Given the above properties, if memory were "continuous" (i.e. not discretized into bytes) then it would be possible in theory to cache an infinite number of data objects in a finite amount of memory, merely by enforcing the constraint that the compressed sizes of the objects conform to the rules of a convergent series as discussed earlier herein. The operation of a cache able to function in accordance with the theory discussed above is described below in connection with FIGS. 1 and 2.

In the graph of FIG. 1, the variable "N" preferably corresponds to the number of each cache object, the value of the number of each cache object representing the recency of use of each such cache object, with increasing values of N corresponding to decreasing recency of use of the cache object associated with that number. The variable "Y" preferably corresponds to the size of each cache object. For the "Y" variable, a value of "1" may correspond to the size of a cache object in its highest-quality condition, i.e. when it is not compressed at all. Most-recently-used objects may be represented with low distortion, and less recently used objects may be subject to an extent of compression consistent with the recency of the last use thereof. It may be seen in FIG. 1 that the value of the compressed cache-object size, Y, declines with decreasing recency of use of the pertinent cache object. Note that the "Y" variable may correspond to an absolute size of each object (whether compressed or not) in the cache (expressed in arbitrary units). Alternatively, in one or more other embodiments, "Y" may correspond to a compression ratio, with, for example, the value "1" corresponding to a full-size object, and the value "0.5" corresponding to an object occupying one half of its uncompressed size.

Figure 2:
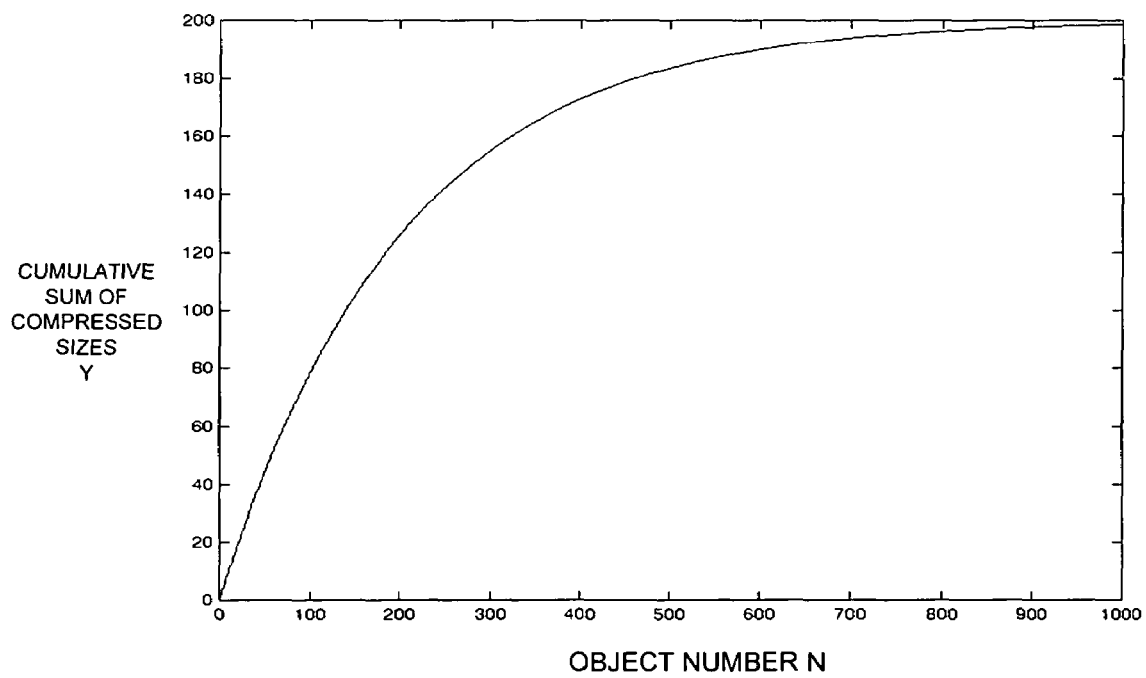
FIG. 2 is a graph of the cumulative sum of the data storage space occupied by cache objects in a cache plotted against the number, "N," of cache objects summed, in accordance with one or more embodiments of the present invention.

With reference to FIG. 2, the cumulative sum of the sizes Y of the objects numbered from 1 to N, for each value of N, may still be a finite number, as shown in FIG. 2. The units of the variable "Y" may be units of data storage space corresponding to the size (or data storage space needed by) one representative fully expanded (uncompressed) cache object. Since FIGS. 1 and 2 aid an understanding of the theory of one or more embodiments of the present invention, information describing the size of the cache objects in bits and/or bytes of data is not provided herein.

In one or more embodiments, the theoretical implementation described above is preferably modified for two reasons. First, in practice, memory storage is preferably composed of discrete storage units. Thus, for example, it is usually meaningless in practice to compress a cache object to occupy an amount of storage space that is smaller than one bit. Second, the total number of operations performed on the cache is preferably finite. In contrast, enforcing a continuous curve of compression ratios described by one of the convergent formulas above may involve reducing the size of every cache object in the cache every time additional cache storage space was needed. This would require an impractically large number of operations.

In one or more embodiments, the number of objects in the cache will in practice be finite. However, where the Zeno cache concept is employed, this number may be much larger than would be possible with conventional MRU caching. Further, cached objects may have the property that if recently used, they may be stored at a high quality level (anywhere from a low level of distortion, or compression lossyness, to lossless compression, to uncompressed data). The quality level of cache objects may become progressively worse (i.e. be subject to progressively higher levels of distortion or compression lossyness) with each successive cache memory access in which these cache objects are not accessed.

Because computer memory is discrete and there may be a minimum compressed size of a cache object below which a cache object may have no value to a user, cached representations may be subject to a maximum compression ratio that yields this minimum compressed size. Thus, in one or more embodiments, the maximum number of cache objects that can be stored in the cache may equal the total data storage space in the cache divided by the amount of data storage space occupied by a cache object having the above-described minimum compressed size, if the objects are all of equal size. However, the cache objects need not all be of equal size.

There are many ways to design a series which is bounded by one of the equations discussed above (or any other convergent sum), and which therefore has a finite sum. An additional constraint can also be introduced, specifically that the likelihood of any given value repeating in successive values of a series increases at higher values of N such that the number of different values of Y employed may be limited to a reasonable number.

An example of such a series is: 1, $\frac{1}{4}$, $\frac{1}{4}$, $\frac{1}{16}$, $\frac{1}{16}$, $\frac{1}{16}$, $\frac{1}{64}$, $\frac{1}{64}$, $\frac{1}{64}$, $\frac{1}{64}$, $\frac{1}{64}$, $\frac{1}{64}$, $\frac{1}{64}$, $\frac{1}{64}$, $\frac{1}{256}$, etc.

Clearly the sum of the series 1, two quarters, four sixteenths, eight sixty-fourths, etc. is 2, just like $y=1/2^n$, as discussed earlier herein, But, if we take the series out to n=16000, only about $\log_2(16000)$, or about 14, values of y (object data storage space size) may be used.

In one or more embodiments, the log function described above provides one way to cause the number of available values of Y (possible sizes of the cache objects) to grow much more slowly than the value of N. However, the present invention is not limited to the use of this log function, and other mathematical operations that cause the number of values of Y to grow more slowly than the value of N may be employed in connection with the present invention.

In one or more embodiments, when N=one million, as few as 20 values of Y may be used (as determined using the logarithm-based formula recited above). This implies that when space has to be freed in the cache, only a small number of operations may be needed to establish a suitable allocation of data storage space among the cache objects, since the majority of the cache objects will occupy an amount of data storage space that preferably does not need to change.

Other mathematical series may also satisfy the desired criteria for use within a cache memory management system and method. Additionally, it is possible to use series that are not theoretically convergent (i.e. whose sums are infinite), since in practice a finite number of terms will be summed in any case.

In one or more embodiments, random algorithms may be used to improve the basic algorithm in a number of ways. In one more embodiments, the 2*¼, 4*¹/₁₆ etc. series, described above, may include only a small number of available cache object sizes, possibly leading to stark differences in compression ratios between different objects within a cache. Random choice may be used to "squeeze" (reduce the data storage space used by) a randomly selected subset of the cache objects in a weighted fashion until some target amount of space is made available for new cache objects. This approach may provide beneficial results because the exact position in the cache of a cache object may decrease in importance with an increasing number of objects in the cache. The amount by which each object is "squeezed" may also be at least partially randomized. Using randomization algorithms like those discussed herein may reduce obvious discontinuities or thresholds in cache-object quality, which may be perceived in images rendered using cache objects stored in the cache.

In the following, an illustrative example of managing cache objects in a data cache in accordance with one or more aspects of the present invention is presented.

FIG. 3 is a block diagram of a data cache 300 including a plurality of cache objects 302-310 in accordance with one or more embodiments of the present invention. FIG. 4 is a block diagram of the data cache 300 of FIG. 3 in which cache objects 302, 304, 308, and 310 have been resized in accordance with one or more embodiments of the present invention. FIG. 5 is a block diagram of the data cache of FIG. 4 in which an accessed cache object 306 has been resized and restored to cache 300 in accordance with one or more embodiments of the present invention.

In one or more embodiments, including that shown in FIG. 3, cache 300 may include five cache objects (abbreviated "CO" in FIGS. 3-6 for the sake of brevity) CO 1 302, CO 2 304, CO 3 306, CO4 308, and CO 5 310. The number of cache objects (5) shown in FIG. 3 has been selected for convenience in illustrating various concepts described herein. However, fewer or more than five cache objects may be included within cache 300. There is in principle no lower limit to the number of cache objects which may be included within cache 300. In principle, an upper limit of the number of cache objects that may be included within cache 300 may correspond to the total size of the cache divided by the smallest acceptable possible cache object size, which is discussed elsewhere herein.

In FIGS. 3-5, for the sake of describing various concepts disclosed herein, the width of each illustrated cache object is intended to be proportional to the data storage space used by that cache object. Also, in FIGS. 3-5, proceeding from the left-most cache object to the right-most cache object corresponds to increasing recency of access of the displayed cache objects, with the least recently used of the cache objects shown at the extreme left, and the most recently used of the cache objects shown at the extreme right.

FIG. 4 shows cache 300 after CO 3 306 has been accessed by a computing system, such as computing system 700, employing cache 300. In this example, CO 3 306 is not shown within cache 300 in its original position, since this position has been overwritten in the condition of cache 300 shown in FIG. 4. Moreover, free space 402 has been created to make room for an expanded version of CO 3 306 which may occupy more data storage space within cache 300 than did the original version of CO 3 in FIG. 3. In FIG. 5, an expanded version of CO 306 has been written into a portion of cache 300 which was occupied by free space 402 in the cache 300 condition shown in FIG. 4.

Figure 6:
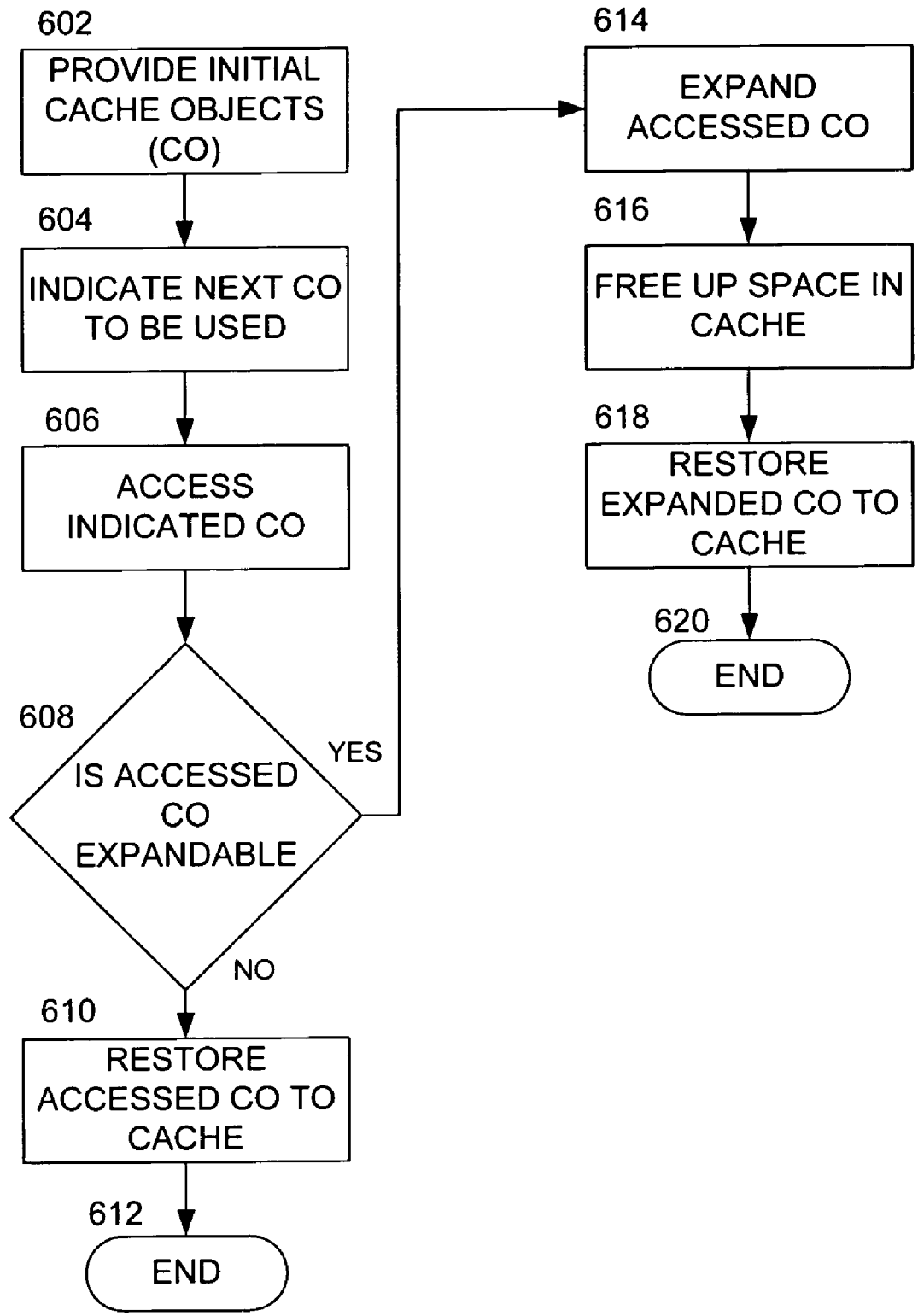
FIG. 6 is a flow diagram of a method for accessing a cache object in a data cache and updating the data cache in accordance with one or more embodiments of the present invention.

FIG. 6 is a flow diagram of a method 600 for accessing a cache object in data cache 300 and updating the data cache 300 in accordance with one or more embodiments of the present invention. Reference is made to FIGS. 3-6 in the following.

At step 602, cache objects 302, 304, 306, 308, and 310 are provided to a program having access to cache 300. The group of cache objects initially present in cache 300 are shown in FIG. 3. This initial condition of cache 300 may result from a default setting in or more programs or from program steps previously executed within one or more programs. In any case, it is the changes made to cache 300 after establishment of the initial condition shown in FIG. 3 that are of interest in the following discussion. Although any one of many programs operating on any one of various computing systems may be in communication with cache 300, for the sake of convenience, software which may access cache 300 is referred to merely as "the program" in the following.

At step 604, an indication may be provided as to which cache object will be the next to be used by the program. At step 606, the indicated cache object, which in this example is CO 3 306, may be accessed by the program.

At step 608, a determination may be made as to whether the accessed cache object is expandable. Herein, a cache object is expandable when it may occupy more data storage space by being subject to a lower compression ratio. Such expansion may be accomplished by supplementing the data already present in the cache object rather than by providing a completely new set of data corresponding to the new compression ratio (or corresponding to a lack of compression).

If the accessed cache object is not expandable, it is preferably restored to cache 300 in step 610. Preferably, in step 610, the restored cache object occupies the same amount of data storage space after being accessed as it did prior to such access. Consistent with the principles of LRU-MRU caching, upon being restored to cache 300, the accessed cache object may be written to the rightmost, or MRU end, of cache 300. Alternatively, however, the accessed cache object could be written to any part of cache 300. Continuing with this branch of method 600, the method 600 preferably ends at step 612.

With reference to step 608, if the accessed cache object, such as cache object 306, is expandable, it is preferably expanded (step 614) in accordance with one or more embodiments of the present invention. As previously discussed herein, expanding a cache object as described above preferably helps provide an arrangement in which the most recently and/or the most frequency accessed cache objects are stored in cache 300 at the highest quality levels.

In one or more embodiments, where there are "N" cache objects in a cache, the number of possible sizes (as measured in data storage space) of such cache objects may be limited to the quantity equal to $\log_2(N)$. Establishing a limited, finite number of possible cache object sizes, as described above, preferably limits the computational expense of determining a new, expanded size for a cache object, such as CO 306, to be expanded in step 614.

In one or more embodiments, the amount of data storage space needed for the expanded (or otherwise stated, less compressed) version of CO 306 may be calculated by a computing system (not shown) having access to cache 300. Where cache 300 is not yet ready to receive the expanded version of CO 306, the expanded version of CO 306 may be written to another memory storage location (not shown) for temporary storage therein.

At step 616, data storage space 402 needed for storing an expanded version of CO 306 is preferably made available within cache 300. If there is sufficient space present within cache 300 to store an expanded version of CO 306 without altering any cache objects within cache 300, then a reduction in size of one or more of the cache objects in cache 300 may be omitted. However, where all or substantially all of the storage space in cache 300 was occupied prior to CO 306 being accessed, one or more of the cache objects other than CO 306 may undergo a reduction in size to free up space in cache 300 for storage of an expanded version of cache 306.

In one or more embodiments, the number of cache object size reduction operations may be reduced where there is a limited number of possible cache object sizes. Limiting the number of cache object size reduction operations preferably operates to reduce the computational burden on a computing system accessing cache 300 and preferably provides for overall computing system efficiency.

In one or more embodiments, there may be various ways to achieve a desired amount of data storage space clearing. Herein, the term "clearing" may correspond to making data storage space available in cache 300 by reducing the data storage space allocated to one or more cache objects within cache 300.

In one or more embodiments, the amount of data storage space to be cleared may correspond to the amount of additional storage needed by the expanded cache object over and above the space it occupied prior to its most recent access by a computing system. However, in other embodiments, the amount of space to be cleared may be smaller or greater than the amount space by which the most recently accessed cache object has increased in size.

In one or more embodiments, the space cleared for the most recently used, expanded cache object may be at one end of cache 300, as is illustrated in FIG. 5. However, in other embodiments, the cleared space could be placed at other locations within cache 300.

In one or more embodiments, the data storage space to be made available may be provided at the expense of one or more of the cache objects of FIG. 3 other than CO 3 306 (the most recently used cache object). Specifically, it may be possible to provide the needed additional space by reducing the size of just one remaining cache object or by reducing the size of all but the most recently used cache object. Moreover, any number of cache objects in between these two extremes may be caused to shed storage space in favor of the expanded, most recently used cache object. In the following, all of the cache objects other than the most recently accessed cache object are considered to be "eligible for size reduction."

In one or more embodiments, the extent of size reduction of the one or more cache objects eligible for size reduction may be selected according one or more considerations. In one embodiment, the cache objects eligible for size reduction may shed an equal or substantially equal amount of storage space. In another embodiment, the eligible cache objects may shed an equal or substantially equal proportion of their pre-reduction size to clear space for the expanded, most recently used cache object.

In one or more other embodiments, the extent of size reduction of each cache object may be based on how recently the cache object was last accessed. Specifically, cache objects eligible for size reduction may shed progressively more storage space with decreasing recency of the last access thereof. Thus, under this approach, the most recently used of the cache objects eligible for size reduction may shed a relatively small amount of storage space, and the least recently used cache object may shed a relatively large amount of data storage space, with those cache objects in between these two extremes shedding intermediate amounts of storage space.

While the discussion of storage space reduction herein is directed primarily to merely reducing the size of cache objects that are not the most recently accessed, in one or more embodiments, one or more cache objects may be removed from cache 300 to clear data storage space. Moreover, such cache object removal may be practiced either alone, or in combination with cache object data storage space reduction of cache objects that will remain within cache 300.

In the embodiment of FIG. 5, all four cache objects 302, 304, 308, and 310 remaining in cache 300 have been reduced in size to clear data storage space for the writing of CO 306 to the position shown at the rightmost end of cache 300. However, in alternative embodiments, three or fewer of the four cache objects 302, 304, 308, and 310 eligible for size reduction could undergo size reduction. Preferably, the method ends at step 620.

In one or more embodiments, rather than managing objects in the cache employing only the recency of use of each cache object as a variable in determining cache object size, cache object management may also involve intelligent guessing about which objects might be needed next. Thus, objects less likely to be needed may be "squeezed" before objects with a higher likelihood of being needed in the future. In one or more embodiments, this guessing approach could be combined with an algorithm that may randomly select objects in the cache for squeezing and which may additionally generate a randomly varying amount of squeezing for the objects selected.

Figure 7:
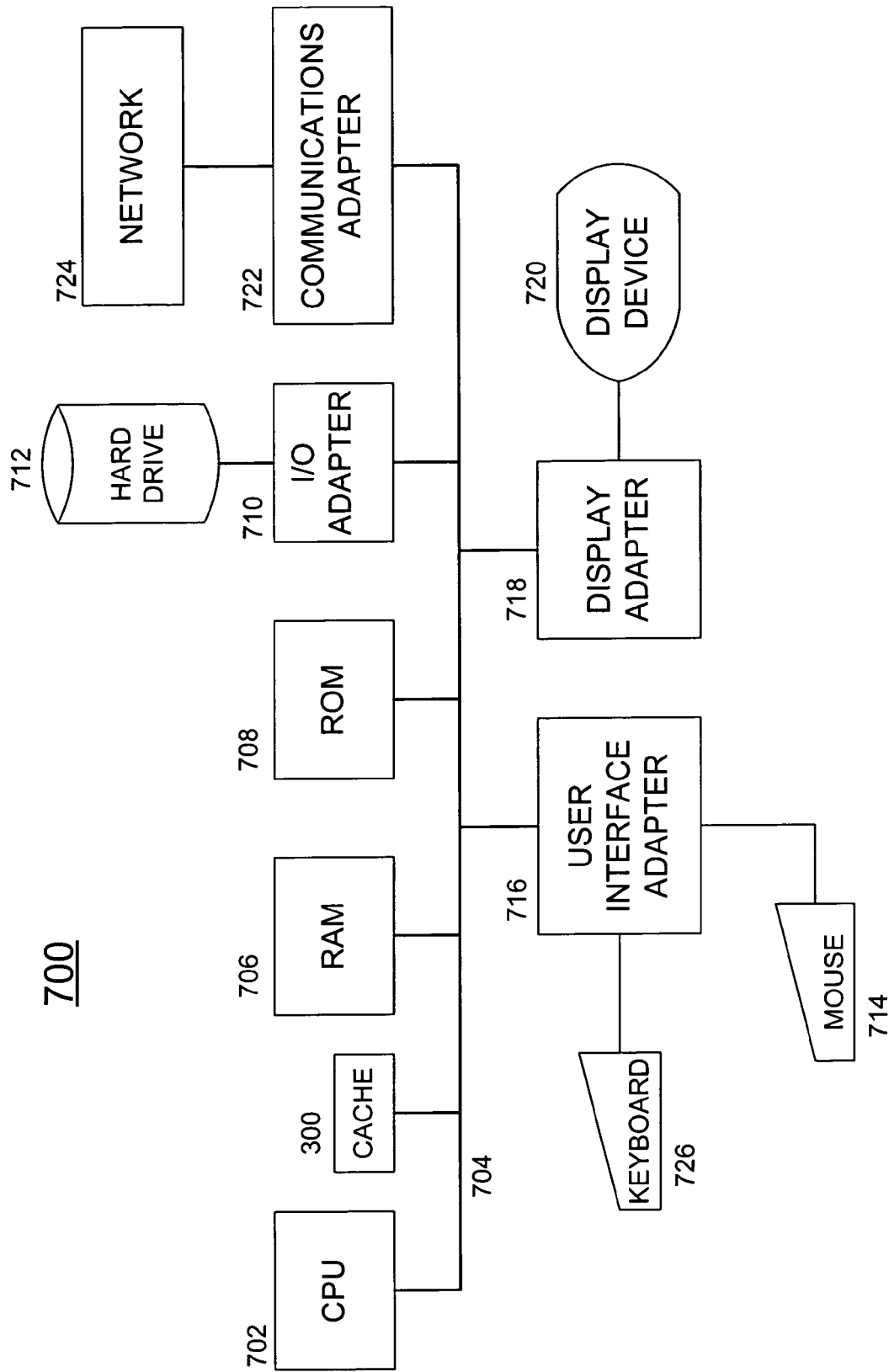
FIG. 7 is a block diagram of a computing system adaptable for use with one or more embodiments of the present invention.

FIG. 7 is a block diagram of a computing system 700 adaptable for use with one or more embodiments of the present invention. In one or more embodiments, central processing unit (CPU) 702 may be coupled to bus 704. In addition, bus 704 may be coupled to inventive cache 300, random access memory (RAM) 706, read only memory (ROM) 708, input/output (I/O) adapter 710, communications adapter 722, user interface adapter 706, and display adapter 718.

In one or more embodiments, RAM 706 and/or ROM 708 may hold user data, system data, and/or programs. I/O adapter 710 may connect storage devices, such as hard drive 712, a CD-ROM (not shown), or other mass storage device to computing system 700. Communications adapter 722 may couple computing system 700 to a local, wide-area, or Internet network 724. User interface adapter 716 may couple user input devices, such as keyboard 726 and/or pointing device 714, to computing system 700. Moreover, display adapter 718 may be driven by CPU 702 to control the display on display device 720. CPU 702 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
providing a cache in a computing system having an initial group of cache objects, each said cache object having an initial compression ratio and including stored data;
decreasing an amount of data storage space occupied by at least one of said cache objects other than a given one of said cache objects, wherein the amount of data storage space occupied by the at least one of said cache objects is progressively decreased based on a decreasing likelihood of need for the at least one of said cache objects, wherein the data storage space is progressively decreased by compressing the at least one of said cache objects utilizing at least two different compression ratios, such that each compression ratio results in a compression of the at least one of said cache objects; and
increasing an amount of data storage space occupied by said given cache object.

2. The method of claim 1 wherein said decreasing comprises decreasing said amount of data storage space by a given amount.

3. The method of claim 2 wherein said increasing comprises increasing said amount of data storage space occupied by said given cache object by said given amount.

4. The method of claim 1 wherein said decreasing comprises increasing from a first compression ratio to a second compression ratio of said at least one cache object.

5. The method of claim 1 wherein said increasing comprises decreasing from a second compression ratio to a first compression ratio of said given cache object.

6. The method of claim 1 wherein said given cache object is a most recently used cache object of said cache objects.

7. The method of claim 1 wherein said at least one cache object undergoing said decreasing step comprises a least recently used cache object of said cache objects.

8. The method of claim 1 wherein said decreasing comprises:
removing a portion of the stored data for said at least one cache object.

9. The method of claim 1 wherein said increasing comprises supplementing said stored data for said given cache object.

10. The method of claim 1 wherein an amount of data storage space available for each of said cache objects may equal one of a finite number of discrete values.

11. The method of claim 1 wherein said decreasing comprises reducing said amount of data storage space for at least one randomly selected cache object of said cache objects, other than said given cache object.

12. The method of claim 11 wherein said reducing comprises reducing said amount of data storage space for said at least one randomly selected cache object to a randomly determined extent.

13. The method of claim 11 wherein said randomly selected cache object is selected using one of a random method and pseudorandom method.

14. The method of claim 11 wherein said selection of said randomly selected cache object is guided by a heuristic.

15. The method of claim 1 further comprising: storing said given cache object in a losslessly compressed form after said increasing.

16. The method of claim 1 further comprising: storing said given cache object in uncompressed form after said increasing.

17. The method of claim 1 wherein said decreasing comprises removing at least one of said cache objects other than said given cache object.

18. An apparatus, comprising:
a computing system having at least one processor capable of operative communication with a main memory; and
a cache in said computing system having an initial group of cache objects, each said cache object having an initial compression ratio and including stored data;
wherein said computing system is operable to:
decrease an amount of data storage space occupied by a first cache object of the initial group of cache objects, wherein the amount of data storage space occupied by the first cache object is progressively decreased based on a decreasing likelihood of need for the first cache object, wherein the amount of data storage space occupied by the first cache object is progressively decreased in at least three increments, wherein each increment corresponds to a new determination of a decreased likelihood of need for the first cache object; and
increase an amount of data storage space occupied by a second cache object.

19. The apparatus of claim 18 wherein said decreasing comprises decreasing said amount of data storage space by a given amount.

20. The apparatus of claim 19 wherein said increasing comprises increasing said amount of data storage space occupied by the second cache object by said given amount.

21. The apparatus of claim 18 wherein said decreasing comprises increasing from an initial ratio to a subsequent ratio for the first object.

22. The apparatus of claim 18 wherein said increasing comprises decreasing an initial compression ratio of said second cache object.

23. The apparatus of claim 18 wherein said second cache object is a most recently used cache object of said cache objects.

24. The apparatus of claim 18 wherein said decreasing comprises removing a portion of the stored data for the first cache object.

25. The apparatus of claim 18 wherein said increasing comprises supplementing said stored data for said second cache object.

26. The apparatus of claim 18 wherein an amount of data storage space available for each of said cache objects may equal one of a finite number of discrete values.

27. The apparatus of claim 18 wherein said decreasing comprises reducing said amount of data storage space for at least one randomly selected cache object of said cache objects, other than said second cache object.

28. The apparatus of claim 27 wherein said reducing comprises reducing said amount of data storage space for said at least one randomly selected cache object to a randomly determined extent.

29. A method, comprising:
providing a cache in a computing system, said cache having a second object, wherein the second object is at a first size;
making a first determination that an insufficient amount of data storage space is present in said cache for a first object;
compressing the second object in said cache to clear data storage space for the first object, wherein the second object is compressed to a second size that is smaller than the first size based on a decreasing recency of use or access of the second object;

making a second determination that an insufficient amount of data storage is present in said cache; and compressing the second object in said cache, wherein the second object is compressed to a third size that is smaller than the second size based on a decreasing recency of use or access of the second object.

30. The method of claim 29 wherein said first object is a new object to said cache or an existing object in said cache.

31. The method of claim 30 further comprising determining the second object has a decreasing recency of use or decreasing level of access.

32. The method of claim 29 further comprising storing said first object in said cache without compressing said first object.

* * * * *